(No Model.) 2 Sheets—Sheet 1.

F. JOHNSON.
GRAIN THRASHER AND SEPARATOR.

No. 269,293. Patented Dec. 19, 1882.

WITNESSES:
C. Neveux
C. Sedgwick

INVENTOR:
F. Johnson
BY Munn & Co
ATTORNEYS.

N. PETERS. Photo-Lithographer, Washington, D. C.

(No Model.) 2 Sheets—Sheet 2.
F. JOHNSON.
GRAIN THRASHER AND SEPARATOR.
No. 269,293. Patented Dec. 19, 1882.
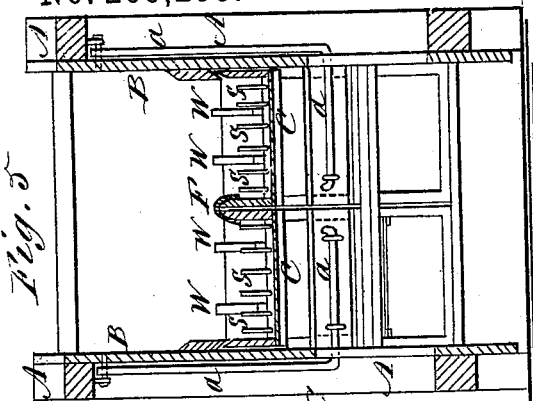
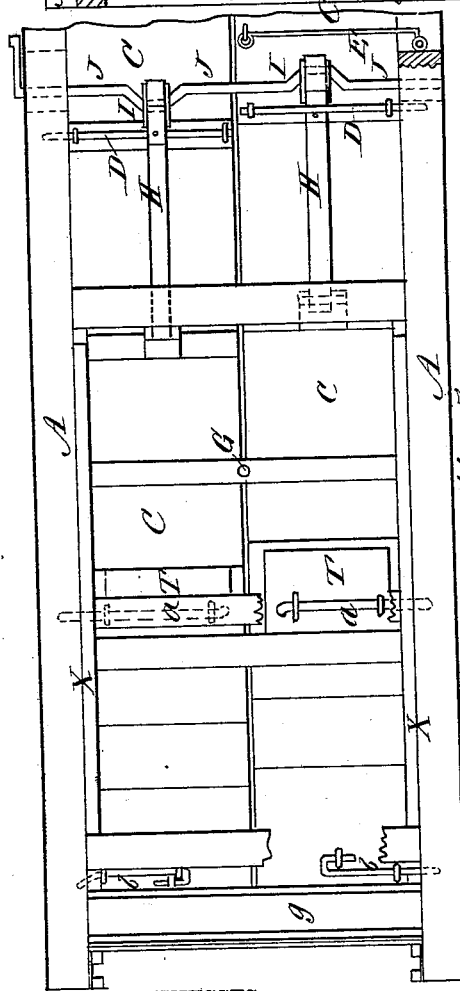
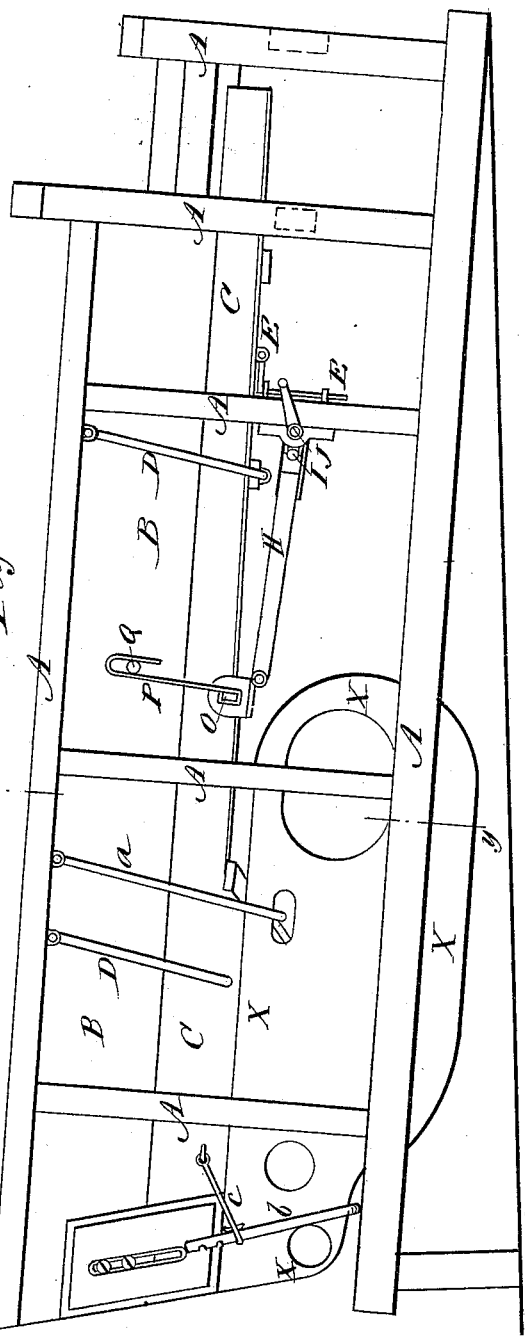

UNITED STATES PATENT OFFICE.

FRANK JOHNSON, OF FREDERICKSBURG, MISSOURI.

GRAIN THRASHER AND SEPARATOR.

SPECIFICATION forming part of Letters Patent No. 269,293, dated December 19, 1882.

Application filed March 31, 1881. (No model.)

*To all whom it may concern:*

Be it known that I, FRANK JOHNSON, of Fredericksburg, in the county of Osage and State of Missouri, have invented a new Improvement in Grain Thrashers and Separators, of which the following is a full, clear, and exact description.

Figure 1:
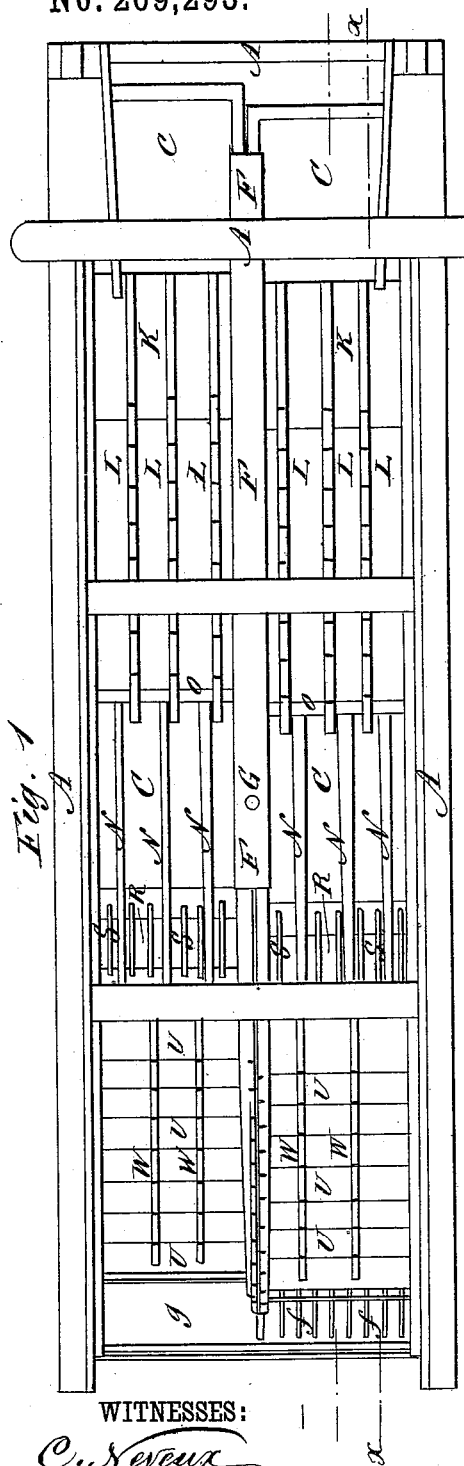
Figure 2:
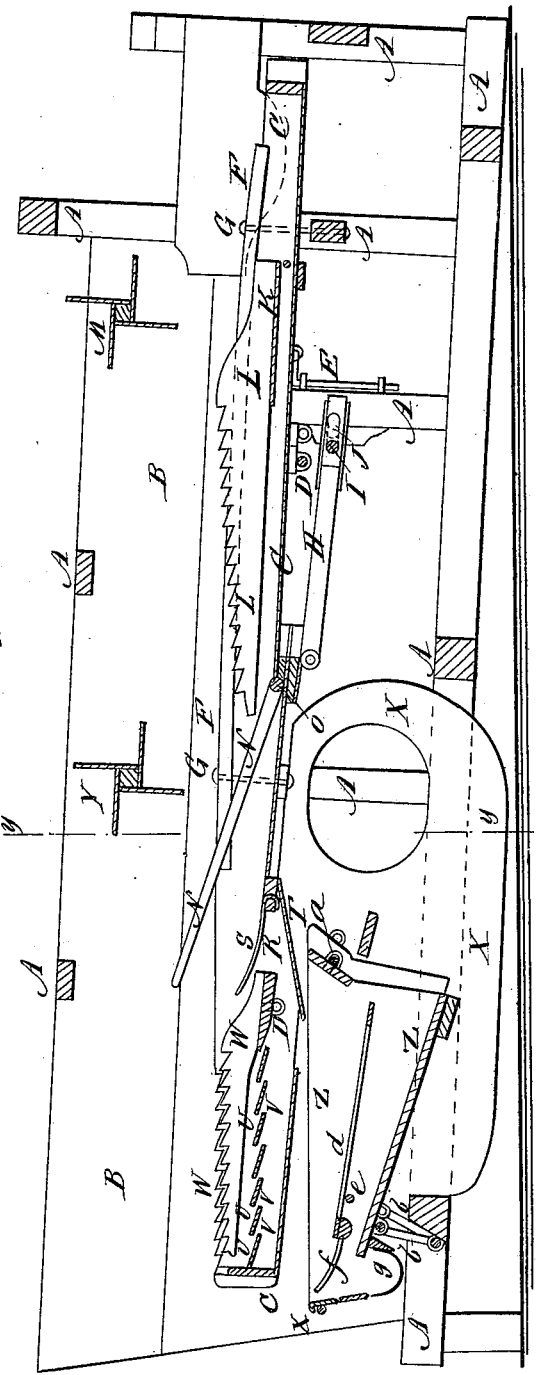

Figure 1, Sheet 1, is a plan view of my improvement. Fig. 2, Sheet 1, is a sectional side elevation of the same, taken through the line $x\ x$, Fig. 1. Fig. 3, Sheet 2, is an under-side view of a part of the improvement. Fig. 4, Sheet 2, is a side elevation of the improvement. Fig. 5, Sheet 2, is a sectional end elevation of the same, taken through the line $y\ y$, Figs. 2 and 4.

The object of this invention is to facilitate the separation of straw and grain in thrashers and promote the efficiency and durability of the separators.

A represents the frame of the separator, to the upper parts of the sides of which are attached casings B.

C are two pans placed side by side, with their forward ends in such positions as to receive the grain and straw from the thrasher. The pans C are supported at their forward and rear parts by the hangers D, the upper ends of which are hinged to the lower sides of the top bars of the frame A, or to the frame A and casing B. The hangers D are bent at a right angle, and their lower arms work in bearings attached to the bottoms of the pans C. Lateral vibration of the pans C is prevented by the hangers E, the upper ends of which are hinged to the bottom of the said pans C at a little distance from their inner edges. At the outer edges of the pans C the hangers E are bent laterally at right angles, and then downward at right angles, and their lower arms work in bearings attached to a post of the frame A. The forward parts of the adjacent side bars of the pans C are provided with a semi-tubular cover, F, the sides of which overlap the inner sides of the said side bars, so as to prevent any straw or grain from getting in between the said pans C. The cover F is attached to the upper ends of rods G, which pass down between the adjacent edges of the said pans, and are attached at their lower ends to cross-bars of the frame A. The cover F is thus supported independently of the pans C and remains stationary while the said pans are vibrated. To the under side of the middle parts of the bottoms of the pans C are hinged the ends of connecting-bars H, the other ends of which are pivoted to cranks I, formed upon the shaft J. The cranks I should project upon different sides of the shaft J, so that the pans C will move in opposite directions. The crank-shaft J revolves in bearings attached to the frame A, and is rotated from the driving mechanism of the thrasher by a belt and pulleys or other suitable means.

To the side bars of each of the pans C, at a little distance from their forward ends, are attached the ends of a plate or bar, K, to the upper side of which are attached the forward ends of the straw rakes or guides L. The guides L are notched upon the upper edge, so that the straw will be agitated as it passes over the said guides, and is carried back by them to shake out the mingled loose grain that may be with the straw. The separation of the grain is further secured by a beater, M, rotating in the sides of the frame over the forward parts of the guides L, and driven from the driving mechanism of the thrasher by belt and pulleys or other suitable gearing. With this construction the guides L and their support K are raised above the bottom of the pan C, so that the grain can pass back freely. From the rear end of the guides L the straw passes to the fingers N, which are attached at their forward ends to a shaft or roller, O, placed in a shoulder or downward offset in the bottom of the pan C, so that the grain can pass over the said shaft O freely. The shaft O works in bearings attached to the pan C, and to its outer end is rigidly attached a bar, P, which passes upward along the outer side of the casing B, and has a longitudinal slot formed in its upper part to receive a pin, Q, attached to the said casing. By this construction, as the pans C are vibrated the fingers N will receive an up-and-down movement to agitate the straw and shake out any grain that may be in it.

To the frame A, directly above the vibrating fingers N, is pivoted a rotary beater, Y, to assist in thoroughly removing the grain from the straw. The beater Y is driven from the driving mechanism of the thrasher by a belt and pulleys or other suitable gearing.

In the bottoms of the pans C, below the rear ends of the fingers N, are formed cross slots or openings R. The slots or openings R are covered with parallel wire fingers S, the rear ends of which are free, and are curved upward slightly. The forward ends of the wires S are bent downward, are passed through a cross-bar of the pan-bottom, and are bent rearward beneath the said cross-bar, so that the said fingers will be firmly supported in place.

To the lower side of the pan-bottom, at the forward edge of the opening R, is attached the forward edge of a downwardly-inclined plate, T, to guide the grain as it falls through the opening R to the cleaner placed beneath the pans C. The bottoms of the pans C, in the rear of the openings R, are formed of slats U, the rear edge of each preceding slat overlapping the forward edge of the succeeding slats in such a manner as to leave openings V between the said overlapped edges, through which any grain that may fall upon the said rear parts of the pans can pass through to the cleaner.

To the cross-bars, at the rear edges of the openings R, are secured the forward ends of the straw-guides W, the lower edges of which rise a little above the slats U, and their upper edges are notched to feed the straw back and agitate it to shake out any grain that may remain with the straw. The rear cross-bars of the pans C rise a little above the bottoms of the said pans to prevent any grain from passing off the rear ends of the pans.

X is the casing of the cleaner, which is attached to the frame A below the rear parts of the pans C. Z are the cleaner-shoes, which are suspended at their forward ends by the hangers $a$, the upper ends of which are hinged to the top bars of the frame A, or to the frame A and casing B. The hangers $a$ are elastic, and their lower arms are bent inward, pass through openings in the casing X, and pass beneath and are secured to the forward ends of the shoes Z. With this construction the longitudinal vibration of the shoes Z will put the vertical parts of the hangers under torsional strain at the end of each stroke, causing them to act as springs to assist in the reverse movement. The rear ends of the shoes Z are supported by the hangers $b$, which work in bearings attached to a cross-bar of the frame A. The inner ends of the hangers $b$ are bent upward, and are hinged to the rear parts of the shoes Z. The outer ends of the hangers $b$ are bent upward along the outer sides of the casing X, overlap the side bars of the pans C, and pass through eyes in the rear ends of the connecting-rods $c$, the forward ends of which are hinged to the side bars of the pans C. With this construction the shoes Z will be vibrated by the vibration of the pans C. Several notches or holes are formed in the outer arms of the hangers $b$ to receive the connecting-rods $c$, so that the vibration of the shoes Z can be regulated. The riddles $d$ are secured in place by rods $e$, passed through the shoes Z, and having nuts screwed upon their outer ends, to which access is had through holes in the casing X.

To the upper riddle, $d$, or to the shoe Z, or to a bar attached to the said shoe, are attached wire fingers $f$, through which the tailings pass into the trough $g$, and which prevent any coarse substance from passing into the said trough. The trough $g$ is attached to the casing X and discharges the tailings through a hole in the said casing. The closed end of the tailings-trough $g$ should be secured adjustably to the casing X, so that a greater or less inclination can be given to the said trough, as may be required.

Having thus described my invention, what I claim as new, and desire to secure by Letters Patent, is—

1. In a thrasher and separator, the two hinged pans C, placed side by side, in combination with the hinged hangers D E, casing B, having sides which overlap the side bars of the pans, the rods G, passing down between the edges of said pans, and means for supporting said rods in position, as shown and described.

2. The combination, with the shoes Z, supporting-frame A, and casing, of hangers $a$, made elastic and having the upper ends hinged to frame A, and their lower ends bent to form arms passing through case X, and secured to the ends of the shoes Z, as shown and described.

3. The combination of pans C, formed with side bars, plates K, secured at their ends to the side bars above the plane of the pans C, and the straw-rakes L, mounted on said plates, substantially as set forth.

4. In a thrashing-machine grain-separator, the combination, with the frame A, the cleaner-shoes Z, and the alternately-vibrating pans C, of the hangers $b$ and the connecting-rods $c$, substantially as herein shown and described, whereby the rear ends of the cleaner-shoes are supported, and the said shoes are vibrated from the separator-pans, as set forth.

FRANK JOHNSON.

Witnesses:
CHARLES HOFFMAN,
SIMON NOLTE.